April 13, 1954   G. M. FORD   2,675,000
DRIP METER FOR INTRAVENOUS INJECTION APPARATUS
Filed May 1, 1950
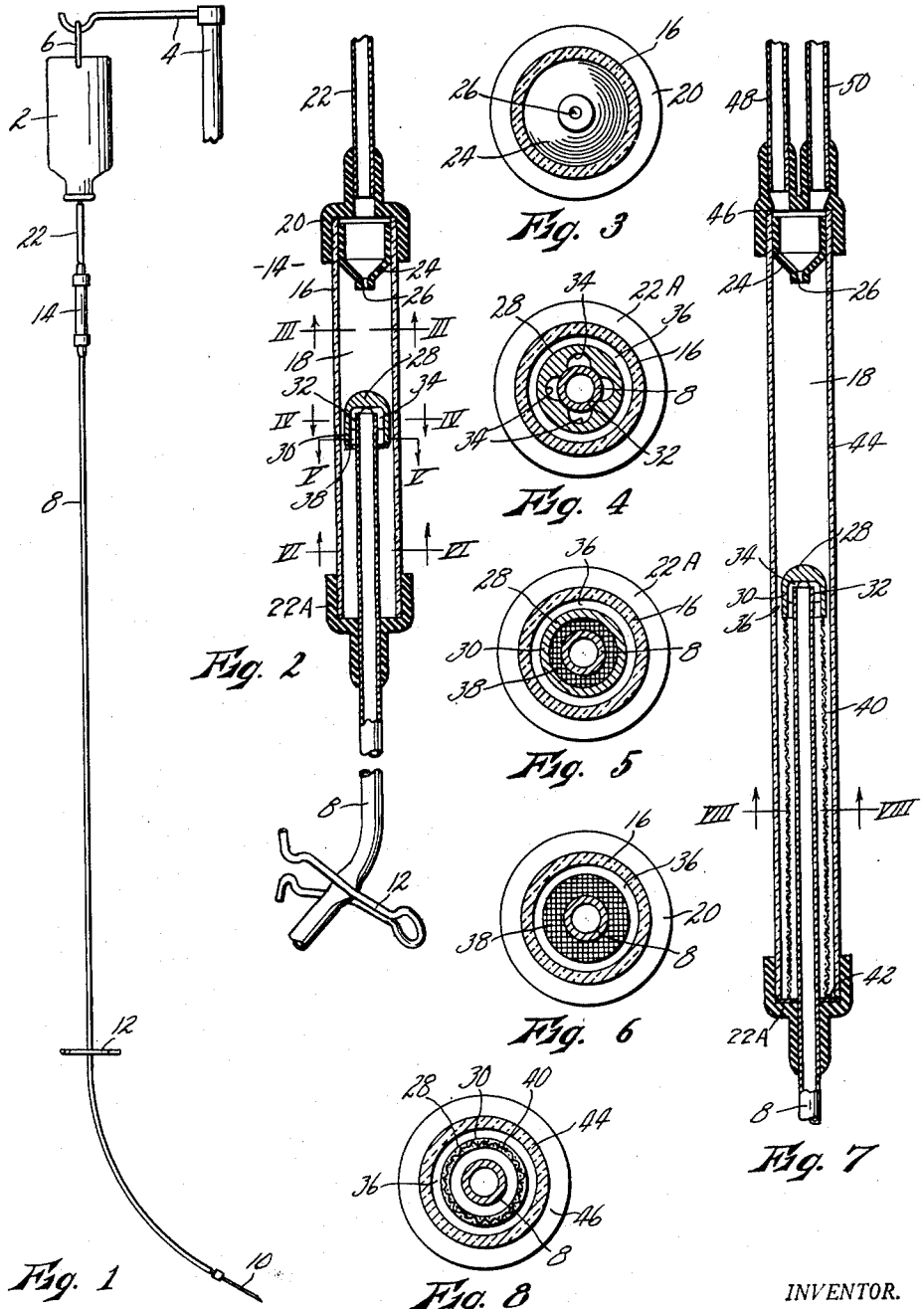
INVENTOR.
Glen M. Ford
BY Hamilton; Hamilton
Attorneys.

Patented Apr. 13, 1954

2,675,000

UNITED STATES PATENT OFFICE 2,675,000

DRIP METER FOR INTRAVENOUS INJECTION APPARATUS

Glen M. Ford, Sedalia, Mo., assignor to Cutter Laboratories, Berkeley, Calif., a corporation of California Application May 1, 1950, Serial No. 159,251

9 Claims. (Cl. 128—214)

This invention relates to new and useful improvements in drip meters for intravenous injection apparatus, and has as its principal object the provision of a device whereby the flow of the injection solution in the tube conducting the solution to the patient may be started and maintained substantially without the formation of air bubbles therein.

In making intravenous injections, the solution to be injected is normally contained in a bottle or other containers at a higher level than the patient, and connected to the hypodermic needle by means of a flexible tube. It is common practice to place an enlarged transparent chamber intermediate the ends of the tube into which the solution drips. The drops may be counted, and the rate of injection into the patient thus metered. The rate of flow or drip is usually made adjustable by means of a hose clamp on the flexible tube. A source of trouble with drip meters of this type has been that in starting the flow the sudden change of flow area in the meter chamber causes a churning or turbulence in the meter chamber, with the result that large quantities of air bubbles enter the feed tube. These bubbles necessarily must be removed, in order to avoid injecting undue amounts of air into the patient's veins. This has been accomplished in the past by allowing a relatively large quantity of fluid to flow through the tube before the needle is inserted into the patient's vein, a wasteful process, or by elevating the needle and tube above the bottle so that the flow into the drip meter and tube will be very gradual or by working out the bubbles by alternately raising and lowering the needle above and below the meter. These processes are time consuming and exasperating. It is difficult also to bring the liquid level in the meter chamber to the proper elevation. The present device insures that the liquid level will always be maintained substantially constant, and that flow can be started with the entry of substantially no bubbles into the feed tube.

Another object is the provision of a drip meter of the class described wherein the feed tube is extended upwardly into the meter chamber, and a cup shaped cap is inverted over the upper end of said tube. Thus a liquid-filled trap is formed which tends to prevent the passage of bubbles therethrough.

A further object is the restriction of the area for the downward flow of solution around the outside of the cap. This in some measure prevents the passage of bubbles below the cap.

A still further object is the covering of the entry of said cap with a fine mesh filter or mesh, which has the function of resisting the passage of bubbles therethrough.

Other objects are simplicity and economy of construction, and trouble-free and completely automatic operation.

With these objects in view, as well as other objects which will appear in the course of the specification, reference will be had to the drawing, wherein:

Fig. 1 is an elevational view of an intravenous injection apparatus including a drip meter embodying the present invention.

Fig. 2 is an enlarged longitudinal section of the drip meter shown in Fig. 1, and related parts.

Fig. 3 is an enlarged section taken on line III—III of Fig. 2.

Fig. 4 is an enlarged section taken on line IV—IV of Fig. 2.

Fig. 5 is an enlarged section taken on line V—V of Fig. 2.

Fig. 6 is an enlarged section taken on line VI—VI of Fig. 2.

Fig. 7 is a view similar to Fig. 2 showing a modification of the drip meter particularly suited for handling blood or other relatively viscous liquids.

Fig. 8 is an enlarged section taken on line VIII—VIII of Fig. 7.

Like reference numerals apply to similar parts throughout the several views, and the numeral 2 applies to a solution bottle which in use is suspended in an inverted position from a suitable stand 4 by means of bail 6. A tube 8, usually of flexible material, is interconnected at its upper end with bottle 2 to receive liquid therefrom, and is interconnected at its opposite end with a hypodermic needle 10. Thus when the needle is inserted into the patient's vein, the solution will flow into his vein from bottle 2 by gravity. The rate of flow is regulated by an adjustable hose clamp 12 of any suitable design carried on tube 8. Means are also provided, though not shown, for venting bottle 2 to the atmosphere, to preserve atmospheric pressure in the bottle over the liquid level therein.

Interconnected in tube 8 intermediate the ends thereof, preferably adjacent bottle 2, is a drip meter 14, shown in detail in Figs. 2 and 6. It includes a hollow cylindrical tube body or chamber member 16 made of glass or other transparent material, the space within said tube forming a drip chamber 18. The upper end of said tube is closed with a rubber cap 20 through which is interconnected the section 22 of tube 8 which is interconnected with bottle 2. The lower end of tube 16 is closed by means of a rubber cap 22A through which extends that portion of tube 8 interconnected with hypodermic needle 10. Tube 8 extends upwardly into drip chamber 18 to a point approximately midway in its length. Here it should be noted that the upper end of the tube 8 and annular space between the transparent chamber 16 and the adjacent portion of the tube 8 form a tortuous channel including an outer upwardly extending portion and inner downwardly extending portion merging therewith. A closure member 24 made of rubber or other suitable material is inserted snugly in the upper portion of glass tube 16, and has a restricted orifice 26 formed centrally therein through which liquid from bottle 2 may drip or flow into chamber 18.

A cup-shaped cap 28 made of plastic or other suitable material is inverted over the upper end of tube 8 within chamber 18, the peripheral wall of said cap forming a skirt 30 of larger internal diameter than the external diameter of tube 8 and extending below the upper end of tube 8. In the interior of said cup a socket 32 is formed centrally and adapted to fit snugly over tube 8, whereby said cap and tube are positioned concentrically. Said cap may be permanently cemented to tube 8 if desired. Grooves 34 are formed in the walls of socket 32 which interconnect the interior of cup 28 with the interior of tube 8. The external diameter of cup 28 is such that there is formed a narrow annular passage or channel 36 between cup 28 and tube 16, for a purpose hereinafter described. Tube 8, while to a degree flexible, is sufficiently rigid to support cap 28 concentrically in tube 16. The open lower end of cap 28 is covered by an annular disc 38 made of a fine mesh screen of cloth or wire. Said disc is cemented or otherwise secured to the lower edge of skirt 30 of cap 28. Tube 8 passes through said mesh disc.

The operation of the device is substantially as follows: With the apparatus in the position shown in Fig. 1, and with clamp 12 open or removed, solution from bottle 2 will flow by gravity from bottle 2 through tube 22 and orifice 26 into chamber 18. The flow is initially quite rapid, due to the lack of back pressure at the orifice. A turbulence, accompanied by the formation of a large quantity of bubbles, is thus caused in chamber 18, and said bubbles would enter tube 8 if means were not provided to prevent it. The mere presence of a cap over tube 8, regardless of its form, prevents the solution from dripping directly into tube 8, which would of course cause the entrapment of air pockets in said tube.

The solution in the upper portion of chamber 18 flows downwardly through annular space or channel 36 between tube 16 and cap 28. The narrowness of said passage will prevent the passage of many bubbles, particularly the larger bubbles which may be larger than the thickness of passage 36. The reason said passage resists the passage of bubbles is of course not due to any resistance to the flow of air as such, but is due to the surface tension of the liquid surrounding the bubbles. The liquid flowing through passage 36 flows down the walls of tube 16 smoothly and with very little splashing or turbulence. Thus the liquid level below cap 28 will rise evenly forcing the air trapped beneath cap 28 out through tube or channel 8 without mixing it as bubbles in the solution. When the liquid level in chamber 18 rises to and above the lower edge of skirt 30 of cap 28, tubes 8 and 16, and cap 28, form a liquid filled trap, which resists the passage of bubbles due to the inherent buoyancy of the bubbles. When the liquid level rises to the upper end of tube 8, flow will start in tube 8, and it will fill evenly and without bubbles. Mesh disc 38 tends to prevent the passage of such bubbles as may have passed through passage 36. Said mesh also utilizes the surface tension of the bubbles to resist their passage.

When tube 8 and needle 10 are completely filled with liquid, clamp 12 may be closed and needle 10 inserted in the patient's vein. When clamp 12 is closed, the liquid level in drip chamber will rise, and continue to rise until the air pressure in chamber rises sufficiently to retard and finally halt dripping or flow from orifice 26. By adjusting clamp 12, any drip rate desired may be obtained.

The modification shown in Figs. 7 and 8 is particularly suited for use in injecting blood or other relatively viscous liquids. It is substantially similar to the form shown in Figs. 2 and 6 except that mesh disc 38 is replaced with a filter tube 40. Said filter is of substantially cylindrical form and disposed concentrically about tube 8 within chamber 18. It is made of a closely woven fabric. It is cemented at its upper end to the lower edge of skirt 30 and at its lower end to an annular disc 42. Said disc encircles tube 8, and has its edge portion gripped between cap 42 and the end of tube 44, which corresponds to tube 16 of the preferred form. Tube 44 is made longer than tube 16 to provide for the extra length of filter 40. Said filter is of sufficient area to provide an adequate rate of flow therethrough even of viscous liquids. Tube 44 is closed at its upper end with a rubber cap 46 similar to cap 20 of the preferred form except that it is provided with connections for two separate flexible tubes 48 and 52. These tubes may be connected with separate bottles of solution which it is desired to mix before injection.

Thus it is apparent that a drip meter having several advantages has been produced. The tubular body member will always be filled substantially to the same level, and flow will be started substantially without the entry of air bubbles into the tube 8 to the hypodermic needle. This invention relates particularly to the starting of the flow in the apparatus, since it is apparent that once the liquid level has risen above cap 28 and the drip rate established, there will be little turbulence in chamber 18 and few bubbles formed. However, the trap and filter portions of the device will function in the same manner at any time during the operation of the device when, due to a high drip rate or other cause bubbles may form in chamber 18.

Although I have shown specific embodiments of my invention, it is apparent that many minor changes of construction and operation could be made without departing from the spirit of the invention, and it is therefore desired that my protection extend to all subject matter falling properly within the scope of the appended claims.

What I claim as new and desire to protect by Letters Patent is:

1. In intravenous injection apparatus of the class described wherein the liquid to be injected flows by gravity from a container to a hypodermic needle, a drip meter comprising a generally vertically disposed transparent body member adapted to be interconnected at its upper end with said container, a closure member with a restricted orifice therethrough carried in the upper portion of said body member, a tube extending upwardly into said body member and adapted to be interconnected at its lower end with said hypodermic needle, said tube terminating in spaced relation from said closure member and a cap carried in said body member and interposed between said orifice and the end of said tube, said cap having a depending peripheral skirt which encircles and extends below the end of said tube.

2. In intravenous injection apparatus of the class described wherein the liquid to be injected flows by gravity from a container to a hypodermic needle, a drip meter comprising a generally vertically disposed transparent body member adapted to be interconnected at its upper end with said container, a closure member with a restricted orifice therethrough carried in the upper portion of said body member, a tube extending upwardly into said body member and adapted to be interconnected at its lower end with said hypodermic needle, said tube terminating in spaced relation from said closure member and a cap carried in said body member and interposed between said orifice and the end of said tube, said cap extending in closely spaced apart relation to the walls of said body member and having a depending peripheral skirt which encircles and extends beneath the end of said tube.

3. In intravenous injection apparatus of the class described wherein the liquid to be injected flows by gravity from a container to a hypodermic needle, a drip meter comprising a generally vertically disposed transparent body member adapted to be interconnected at its upper end with said container, a closure member with a restricted orifice therethrough carried in the upper portion of said body member, a tube extending upwardly into said body member and adapted to be interconnected at its lower end with said hypodermic needle, said tube terminating in spaced relation from said closure member, a cap of inverted cup shape disposed over the upper end of said tube and having passages formed therein whereby liquid entering said cup may enter said tube, and a fine mesh filter through which all liquid entering the body member must flow to enter said cap.

4. In intravenous injection apparatus of the class described wherein the liquid to be injected flows by gravity from a container to a hypodermic needle, a drip meter comprising a generally vertically disposed transparent tubular body member, a closure member carried in the upper portion of said body member and having a restricted orifice formed centrally therein, a closure member sealing the lower end of said body member, a tube extending through said lower closure member and extending upwardly in said body member, said tube terminating at its upper end in spaced relation below said upper closure member and being adapted to be connected at its lower end with said needle, a circular cap of inverted cup shape and of smaller diameter than the internal diameter of said body member disposed within said body member over the upper end portion of said tube, and a filter member covering the entrance to said cap.

5. In intravenous injection apparatus of the class described wherein the liquid to be injected flows by gravity from a container to a hypodermic needle, a drip meter comprising a generally vertically disposed transparent tubular body member, a closure member carried in the upper portion of said body member and having a restricted orifice formed centrally therein, a closure member sealing the lower end of said body member, a tube extending through said lower closure member and extending upwardly in said body member, said tube terminating at its upper end in spaced relation below said upper closure member and being adapted to be connected at its lower end with said needle, a circular cap of inverted cup shape and of smaller diameter than the internal diameter of said body member disposed within said body member over the upper end portion of said tube, and a flat disc of fine mesh material covering the bottom opening of said cup, said disc having a hole formed therethrough for the passage of said tube.

6. In intravenous injection apparatus of the class described wherein the liquid to be injected flows by gravity from a container to a hypodermic needle, a drip meter comprising a generally vertically disposed transparent tubular body member, a closure member carried in the upper portion of said body member and having a restricted orifice formed centrally therein, a closure member sealing the lower end of said body member, a tube extending through said lower closure member and extending upwardly in said body member, said tube terminating at its upper end in spaced relation below said upper closure member and being adapted to be connected at its lower end with said needle, a circular cap of inverted cup shape and of smaller diameter than the internal diameter of said body member disposed within said body member over the upper end portion of said tube, and a hollow cylindrical filter member disposed about said tube, being secured at its upper end to said cap and at its lower end to the bottom closure member.

7. A drip meter comprising: a transparent chamber provided with an internal trapped solution discharge channel, said channel including an upwardly extending portion for the ingress of solution from said chamber thereinto merging with a downwardly extending portion for the egress of solutions therefrom to a point external to said chamber; and a drip nipple mounted within said chamber above the upper level of said channel.

8. A drip meter comprising: an upstanding transparent chamber; an upstanding fluid outlet tube mounted within the lower end of said chamber for the egress of fluid therefrom; a cap mounted over the upper end of said tube, portions thereof being positively spaced from said tube so as to provide fluid channels therebetween; and a drip nipple mounted within said chamber above the level of said cap.

9. A drip meter comprising: an elongated, upstanding transparent chamber; a first cap sealed over the lower end of said chamber; a fluid outlet tube extending upwardly through said first cap into said chamber; a second cap mounted on the upper end of said tube, portions of said cap having frictional engagement with said tube and other portions thereof being positively spaced therefrom to form fluid channels therebetween; and a drip nipple mounted within said chamber above the level of said first cap.

References Cited in the file of this patent

UNITED STATES PATENTS

| Number | Name | Date |
| --- | --- | --- |
| 1,069,042 | Sullivan | July 29, 1913 |
| 2,231,418 | Trotter | Feb. 11, 1941 |
| 2,414,239 | Page et al. | Jan. 14, 1947 |
| 2,414,240 | Page | Jan. 14, 1947 |
| 2,464,496 | Gee | Mar. 15, 1949 |
| 2,470,943 | Page | May 24, 1949 |
| 2,473,153 | Lager | June 14, 1949 |
| 2,586,513 | Butler | Feb. 10, 1952 |